(12) United States Patent
Prakah-Asante et al.

(10) Patent No.: US 10,589,741 B2
(45) Date of Patent: Mar. 17, 2020

(54) ENHANCED COLLISION AVOIDANCE

(71) Applicant: Ford Global Technologies, LLC, Dearborn, MI (US)

(72) Inventors: Kwaku O. Prakah-Asante, Commerce Township, MI (US); Basavaraj Tonshal, Northville, MI (US); Yifan Chen, Ann Arbor, MI (US); Padma Aiswarya Kolisetty, Chennai (IN); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/747,910

(22) PCT Filed: Aug. 27, 2015

(86) PCT No.: PCT/US2015/047216
§ 371 (c)(1),
(2) Date: Jan. 26, 2018

(87) PCT Pub. No.: WO2017/034580
PCT Pub. Date: Mar. 2, 2017

(65) Prior Publication Data
US 2019/0009776 A1    Jan. 10, 2019

(51) Int. Cl.
*B60W 30/095* (2012.01)
*B60W 30/08* (2012.01)
(Continued)

(52) U.S. Cl.
CPC ...... *B60W 30/0956* (2013.01); *B60W 30/095* (2013.01); *B60W 50/14* (2013.01);
(Continued)

(58) Field of Classification Search
CPC ............. B60W 30/0956; B60W 50/16; B60W 2550/308; B60W 50/14; B60W 30/095; B60W 30/08; G08G 1/166; B60Q 9/008
See application file for complete search history.

(56) References Cited

U.S. PATENT DOCUMENTS 3,634,792 A * 1/1972 Blomenkamp ........ B60Q 1/444
340/464
3,861,349 A    1/1975 Conley
(Continued)

FOREIGN PATENT DOCUMENTS

CN    103500488 A    1/2014
JP    2013233874    11/2013
(Continued)

OTHER PUBLICATIONS

Powale, "Design and Testing of Roadside Traffic Threat Alerting Mechanism", Department of Electrical Engineering and Computer Science at that Massachusetts Institute of Technology, May 24, 2013.
(Continued)

*Primary Examiner* — Frederick M Brushaber
(74) *Attorney, Agent, or Firm* — Brandon Hicks; Bejin Bieneman PLC

(57) ABSTRACT

A headway between a first vehicle and a second vehicle is determined. A predicted time to collision between the first vehicle and the second vehicle is determined. A first mechanism in a wearable device in the first vehicle is actuated when the headway is less than a predetermined threshold. A second mechanism in the first vehicle is actuated when the predicted time to collision is less than a second predetermined threshold.

20 Claims, 2 Drawing Sheets

(51) Int. Cl.
*B60W 50/14* (2020.01)
*B60W 50/16* (2020.01)
*G08G 1/16* (2006.01)
*B60Q 9/00* (2006.01)

(52) U.S. Cl.
CPC ............ *B60W 50/16* (2013.01); *G08G 1/166* (2013.01); *B60W 2550/308* (2013.01)

(56) References Cited

U.S. PATENT DOCUMENTS

| | | | |
|---|---|---|---|
| 7,095,336 B2 | 8/2006 | Rodgers et al. | |
| 7,908,060 B2 | 3/2011 | Basson et al. | |
| 2002/0101360 A1* | 8/2002 | Schrage | G08G 1/095 340/901 |
| 2003/0171890 A1* | 9/2003 | Traylor | B60Q 1/444 702/141 |
| 2004/0249571 A1* | 12/2004 | Blesener | B61L 29/28 701/301 |
| 2006/0213714 A1* | 9/2006 | Igawa | B60R 21/0134 180/274 |
| 2011/0193693 A1 | 8/2011 | Filev et al. | |
| 2013/0141576 A1 | 6/2013 | Lord et al. | |
| 2013/0187792 A1 | 7/2013 | Egly | |
| 2013/0226408 A1 | 8/2013 | Fung et al. | |
| 2014/0022390 A1* | 1/2014 | Blank | B60R 1/12 348/148 |
| 2017/0146801 A1* | 5/2017 | Stempora | G06Q 40/08 |
| 2018/0004213 A1* | 1/2018 | Absmeier | B60W 30/0956 |
| 2018/0275654 A1* | 9/2018 | Merz | G01S 13/9303 |
| 2018/0338241 A1* | 11/2018 | Li | H04L 67/12 |
| 2018/0348967 A1* | 12/2018 | Kondrk | G06F 9/451 |

FOREIGN PATENT DOCUMENTS

| | | |
|---|---|---|
| JP | 2015095079 A | 5/2015 |
| WO | 2015010320 A | 1/2015 |

OTHER PUBLICATIONS

International Preliminary Report on Patentability for PCT/US2015/047216 dated Mar. 8, 2018 (6 pages).

* cited by examiner

ENHANCED COLLISION AVOIDANCE

CROSS-REFERENCE TO RELATED APPLICATIONS

This application is a national stage of, and claims priority to, Patent Cooperation Treaty Application No. PCT/US2015/047216, filed on Aug. 27, 2015, which application is hereby incorporated herein by reference in its entirety.

BACKGROUND

Forward collision warning systems provide a way for vehicle drivers to adjust their driving behavior if a collision with another vehicle may occur. An important part of such systems may be providing output indicating an impending collision so that a driver can take evasive action. Current systems may include actuation of mechanisms that provide output to all vehicle occupants other than the vehicle driver.

DETAILED DESCRIPTION

Figure 1:
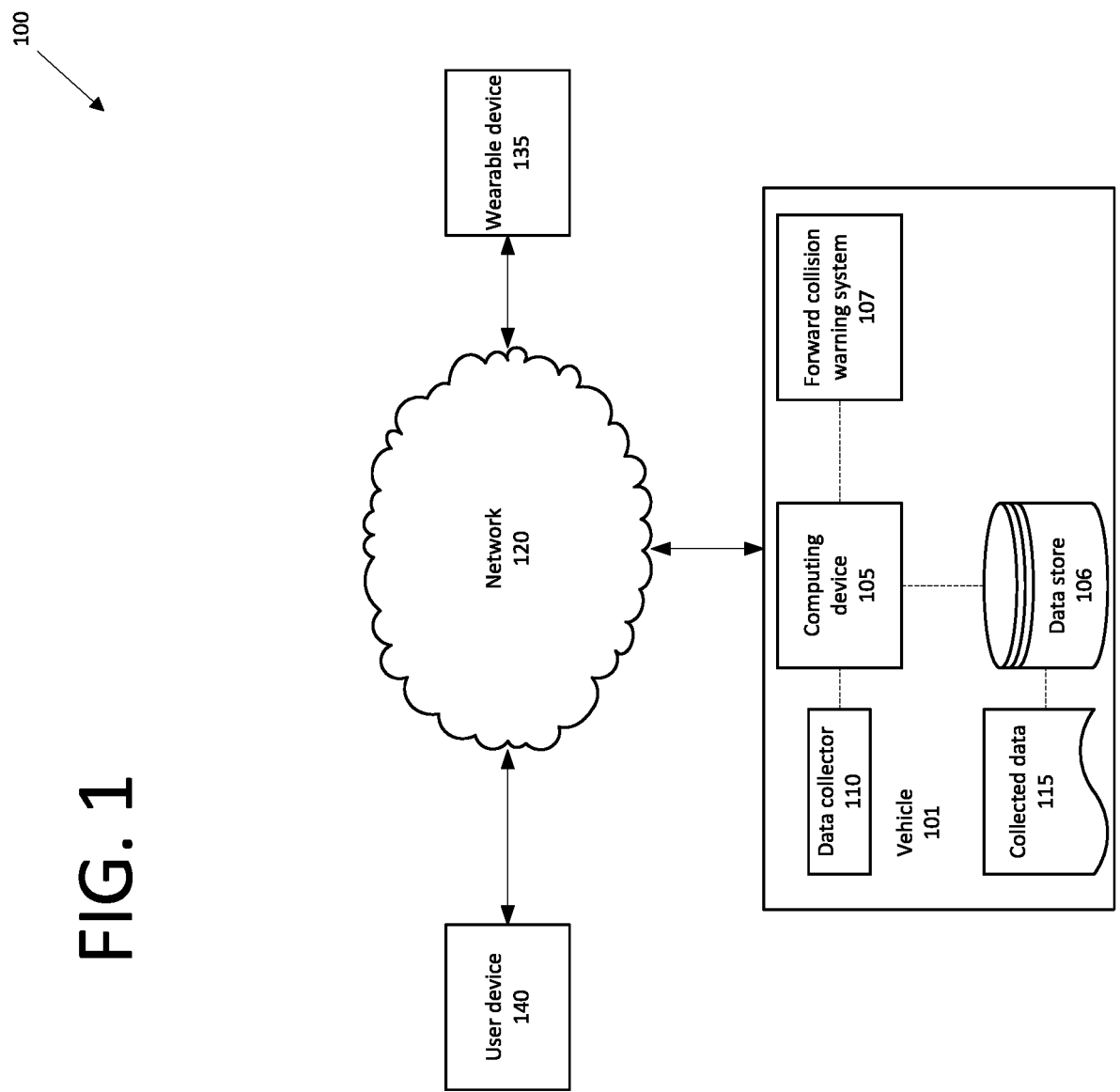
FIG. 1 is a block diagram of an example system for including a wearable device providing output indicating a possible vehicle collision.

FIG. 1 illustrates an example system 100 for providing an alert to a wearable device. The system 100 includes a vehicle 101 having a computing device 105, a memory and/or other data store 106, a forward collision warning system 107, data collectors 110, and collected data 115. The computing device 105 is configured to receive information, e.g., the collected data 115, from the data collectors 110 concerning various metrics related to the vehicle 101. For example, the data 115 may include a speed (i.e., velocity) of the vehicle 101, vehicle 101 acceleration and/or deceleration, data related to a vehicle 101 path or steering, biometric data related to a vehicle 101 operator, e.g., heart rate, respiration, pupil dilation, body temperature, state of consciousness, etc. Further examples of data 115 may include data indicating whether vehicle sub-systems (e.g., a steering system, a powertrain system, a brake system, internal sensing, external sensing, etc.) are operational, and/or data 115 relating to a state of such sub-systems, e.g., a steering wheel torque, brake pressure, engine torque, etc. The computing device 105 may be configured to collect data 115 from the vehicle 101 in which it is installed, i.e., a first or host vehicle, and/or may be configured to collect data 115 from another vehicle 101, e.g., a second or target vehicle.

The computing device 105 is generally configured, i.e., programmed and/or provided with hardware, for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be configured for communicating with the network 120, which, as described below, may include various wired and/or wireless networking technologies, e.g., cellular, Bluetooth, wired and/or wireless packet networks, etc.

The data store 106 may include one or more known media, e.g., hard disk drives, solid-state drives, or any volatile or non-volatile computer memory. The data store 106 typically stores the collected data 115 sent from the data collectors 110.

The forward collision warning system 107, as is known, is included in the vehicle 101 and can determine whether a frontal vehicle 101 collision with a second vehicle is imminent, and, upon such determination, can actuate one or more vehicle mechanisms without driver intervention, e.g., braking, steering, throttle, etc. Further, the collision warning system 107 may include an output mechanism to indicate a potential frontal collision, e.g., sounds and/or visual indicators provided via the vehicle 101 HMI.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance between the vehicle 101 and other vehicles or objects.

Collected data 115 may include a variety of data collected in a vehicle 101. Examples of collected data 115 are provided above, and moreover, data 115 is generally collected using one or more data collectors 110, and may additionally include data calculated therefrom in the computer 105. In general, collected data 115 may include any data that may be gathered by the data collectors 110 and/or computed from such data.

The system 100 further includes a network 120. The network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The system 100 includes a wearable device 135. The wearable device 135 may be any one of a variety of computing devices wearable by a person, e.g., on a wrist, around a neck or waist, etc., of a vehicle driver. The device 135 includes a processor and a memory, as well as communication mechanisms such as are known. For example, the wearable device 135 may be a watch, a smart watch, a vibrating apparatus, etc. that includes hardware and programming to provide wireless communications using IEEE 802.11, Bluetooth, and/or cellular communications protocols. Further, the wearable device 135 may use such communications capabilities to communicate via the network 120 and also directly with a vehicle computer 105, e.g., using Bluetooth or the like.

The system 100 further includes a user device 140. The user device 140 may be any one of a variety of computing devices including a processor and a memory, e.g., a smartphone, a tablet, a personal digital assistant, etc. the user device 140 may use the network 120 to communicate with the vehicle computer 105 and the wearable device 135.

Figure 2:
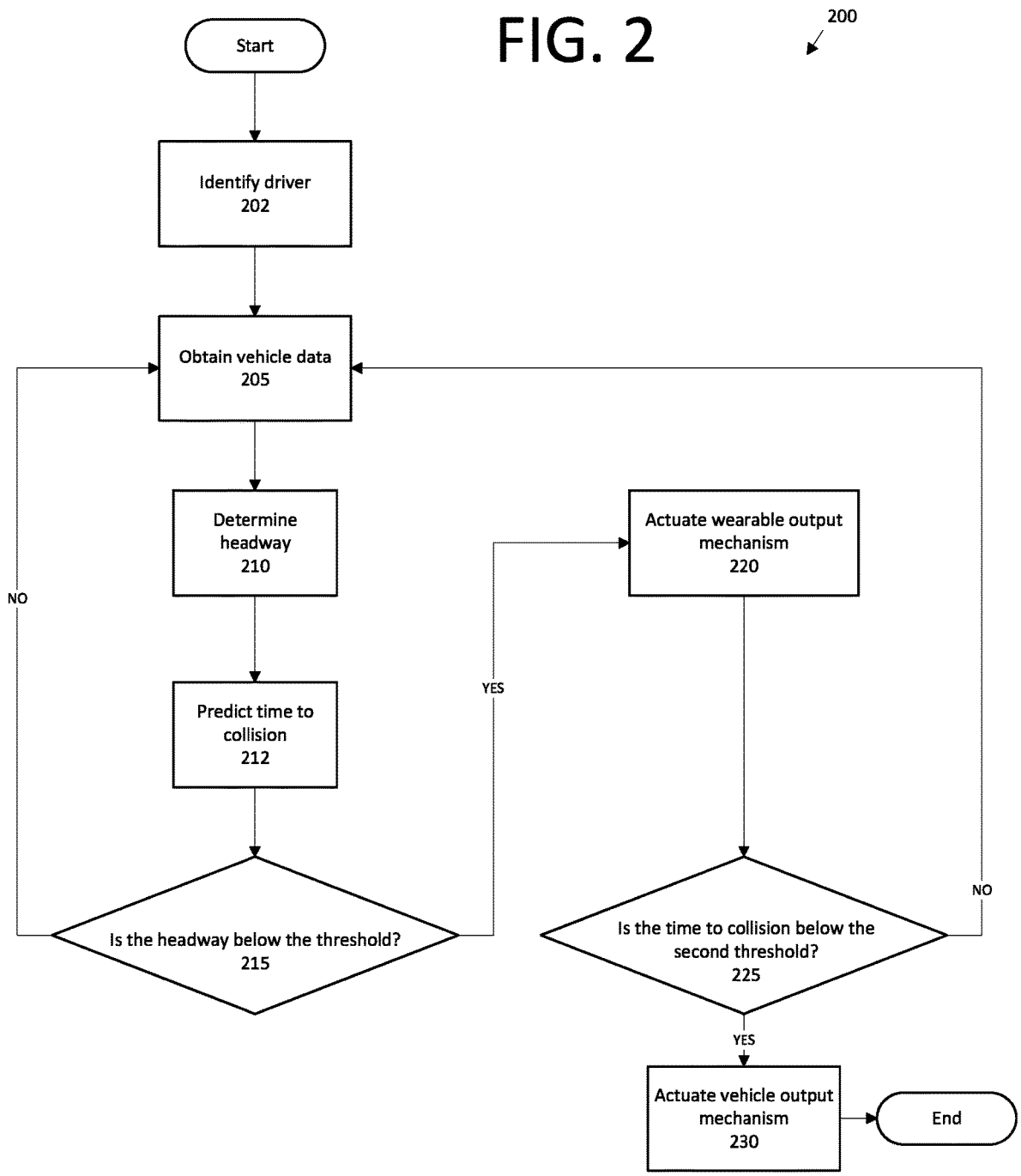
FIG. 2 is a block diagram of an example process for providing an indication of a possible vehicle collision from a wearable device.

FIG. 2 illustrates a process 200 for activating alerts in the vehicle 101 based on the distance between the host vehicle and the target vehicle. The process 200 starts in a block 202, in which the computing device 105 identifies the occupant. The computing device 105 may identify the driver in a known manner, e.g., receiving data from one or more of the wearable device 135, the user device 140, and/or the data collectors 110. For example, the occupant could be identified using image recognition techniques in the computer 105 using data 115 from a camera data collector 110, a user identity could be input via a device 135 of a vehicle 101 HMI, or the device 135 could identify the user/occupant via collected biometric data, e.g., a fingerprint, etc. Upon identifying the occupant, the computing device 105 may retrieve from its data store 106 information about the occupant, including age, size, driving skill level, preferred mechanisms for receiving information (e.g., haptic, audio, etc.), etc.

Next, in a block 205, in which the computing device 105 collects data 115 from the data collectors 110 about the target vehicle. The data 115 may include the position of the target vehicle, the position of the host vehicle, the velocity of the target vehicle, and the velocity of the host vehicle.

Next, in a block 210, the computing device 105 determines a headway with the target vehicle. A "headway," as used herein, is an amount of time separating two vehicles, i.e., a difference in the time at which the two vehicles would pass a common point in a roadway. For example, the headway can be calculated by the following equation:

$$H = \frac{r_t - r_h}{v_h}$$

where H is the headway, $r_t$ is the position of the second or target vehicle, $r_h$ is the position of the first or host vehicle, and $v_h$ is the velocity of the host vehicle. The values $r_t$ and $r_h$ could be expressed in distances relative to a common coordinate system, e.g., in a simple example, $r_t$ could be defined as an origin, i.e., zero, and $r_h$ could be defined as a distance, e.g., in meters, from the origin. The difference between the two, as seen in the numerator of the above expression, would then be a distance in meters which, when divided by a velocity value v, would provide a headway value H in time. Additionally or alternatively, the headway may be an average over several measurements k such that $$H_m(k) = H_m(k-1) + \beta(H - H_m(k-1))$$

where β is a predetermined filter constant and $H_m$ is a mean headway over the measurements k.

Next, in a block 212, the computing device 105, e.g., according to instructions included in the forward warning collision system 107 such as is known, determines a predicted time to collision with the target vehicle. The computing device 105 may additionally or alternatively determine a mean predicted time to collision over a series of measurements k.

Next, in a block 215, the computing device 105 determines whether the headway is below a predetermined threshold. The threshold is generally established to cause actuation of a mechanism in the wearable device 135 before the conventional forward collision warning system 107 triggers an action, e.g., control of one or more vehicle 101 components and/or actuating a vehicle 101 warning mechanism, as described above. The threshold may also be adjusted based on the information retrieved about the occupant in the block 202, e.g., a novice driver may have a lower threshold to account for increased reaction time, a skilled driver may have a higher threshold, etc. Further, the threshold may be in addition to, and set lower than, a threshold used in presently existing collision avoidance systems 107, as mentioned above. The threshold may also be determined at least in part on the host vehicle speed, road conditions, current weather, and/or other data 115 collected by the data collectors 110. If the headway is below the predetermined threshold, the process continues to a block 220. Otherwise, the process returns to the block 205 to collect more vehicle data.

In the block 220, the computing device 105 provides an instruction to the wearable device 135 to actuate one or more output mechanisms. The output mechanisms may include haptic output, e.g. a vibration, audio output, and/or visual output, e.g. flashing lights, flashing colors, etc. Based on the information from the block 202, the one or more output mechanism may be selected according to the occupant. For example, an occupant who is hard of hearing may have a stronger vibration output, while another occupant may prefer a visual output. Advantageously, the computing device 105 may be programmed, e.g., including setting the threshold of the block 215, to cause actuation of the wearable device output prior to an alert, warning, or evasive action implemented by a conventional warning system 107, e.g., a system that provides an indication of, or reacts to, an imminent collision by actuating vehicle lights, sounds, brakes, etc. Thus, the driver of the vehicle 101 in the context of the present system 100 can take evasive and/or avoidance action earlier.

Next, in a block 225, the computing device 105 determines whether the time to collision is lower than a second predetermined threshold, indicating that a forward collision is imminent. The collision warning system 107 may determine the second threshold. If the time to collision is lower than the second predetermined threshold, the process 200 moves to a block 230. Otherwise, the process 200 returns to the block 205 to collect more vehicle data.

In the block 230, the computing device 105 activates one or more second output mechanism, i.e. a vehicle alert, for the forward collision warning system 107, and the process 200 ends. The second output mechanisms may include, e.g., a vibrating steering wheel, an alarm through the vehicle speakers, a flashing light on the dashboard, etc.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   identify an occupant of a first vehicle;
   determine a time difference at which the first vehicle and a second vehicle would pass a predetermined point in a roadway;
   predict a time to collision between the first vehicle and the second vehicle with a forward collision warning subsystem;
   provide a first output in a wearable device of the occupant in the first vehicle when the time difference is less than a predetermined threshold, the first output and the threshold based on the identified occupant; and
   then, after providing the first output, provide a second output in the first vehicle when the predicted time to collision is less than a second predetermined threshold.

2. The system of claim 1, wherein the instructions include instructions to provide the first output only on the wearable device worn by a driver of the host vehicle.

3. The system of claim 1, wherein the instructions include instructions to determine a mean headway based on a current headway and a set of previous time difference calculations.

4. The system of claim 3, wherein the instructions include instructions to provide the first output on the wearable device when the mean time difference is less than the predetermined threshold.

5. The system of claim 1, wherein the instructions include instructions to calculate a mean predicted time to collision based on a current predicted time to collision and a set of previous predicted time to collision calculations.

6. The system of claim 5, wherein the instructions include instructions to provide the second output in the vehicle when the mean predicted time to collision is less than the second predetermined threshold.

7. The system of claim 1, wherein the instructions further include instructions to provide the first output as a haptic output.

8. The system of claim 1, wherein the instructions further include instructions to provide the first output before providing the second output.

9. The system of claim 1, wherein the predetermined threshold is calculated to provide the first output before the second output is provided.

10. The system of claim 1, wherein the instructions further include instructions to identify the occupant as one of a novice driver or a skilled driver, wherein a first threshold associated with the skilled driver is higher than a second threshold associated with the novice driver.

11. A method, comprising:
    identifying an occupant of a first vehicle;
    determining a time difference at which the first vehicle and a second vehicle would pass a predetermined point in a roadway;
    predicting a time to collision between the first vehicle and the second vehicle with a forward collision warning subsystem;
    providing a first output in a wearable device of the occupant in the first vehicle when the time difference is less than a predetermined threshold, the first output and the threshold based on the identified occupant; and
    then, after providing the first output, providing a second output in the first vehicle when the predicted time to collision is less than a second predetermined threshold.

12. The method of claim 11, further comprising providing the first output only on the wearable device worn by a driver of the host vehicle.

13. The method of claim 11, further comprising determining a mean time difference based on a current time difference and a set of previous time difference calculations.

14. The method of claim 13, further comprising providing the first output on the wearable device when the mean time difference is less than the predetermined threshold.

15. The method of claim 11, further comprising determining a mean predicted time to collision based on a current predicted time to collision and a set of previous predicted time to collision calculations.

16. The method of claim 15, further comprising providing the second output in the vehicle when the mean predicted time to collision is less than the second predetermined threshold.

17. The method of claim 11, further comprising providing the first output as a haptic output.

18. A system, comprising:
a wearable device of an occupant in a first vehicle;
a haptic device in a first vehicle;
means for identifying the occupant in the first vehicle;
means for determining a time difference at which the first vehicle and a second vehicle would pass a predetermined point in a roadway;
means for predicting a time to collision between the first vehicle and the second vehicle with a forward collision warning subsystem;
means for providing a first output in the wearable device of the occupant in the first vehicle when the time difference is less than a predetermined threshold, the first output and the threshold based on the identified occupant; and
means for providing a second output to the haptic device in the first vehicle after providing the first output when the predicted time to collision is less than a second predetermined threshold.

19. The system of claim 18, further comprising means for actuating a wearable haptic device in the wearable device.

20. The system of claim 18, further comprising means for determining a mean predicted time to collision based on a current predicted time to collision and a set of previous predicted time to collision calculations.

* * * * *